United States Patent [19]
Burns

[11] Patent Number: 5,760,711
[45] Date of Patent: Jun. 2, 1998

[54] ICING DETECTION SYSTEM

[75] Inventor: Joseph D. Burns, Parker, Colo.

[73] Assignee: ICG Technologies, LLC, Phoenix, Ariz.

[21] Appl. No.: 639,353

[22] Filed: Apr. 26, 1996

[51] Int. Cl.$^6$ .................................................. G08B 21/00
[52] U.S. Cl. ........................ 340/962; 73/170.26; 340/583
[58] Field of Search .............................. 340/962, 583,
340/580; 73/170.26, 590, 602; 244/134 F;
250/227.15, 227.28; 356/73.1

[56] References Cited

U.S. PATENT DOCUMENTS

| | | | |
|---|---|---|---|
| 4,688,185 | 8/1987 | Magenheim et al. | 340/580 |
| 4,782,331 | 11/1988 | Martens | 340/583 |
| 4,803,470 | 2/1989 | Fineman | 340/583 |
| 5,014,042 | 5/1991 | Michoud et al. | 340/583 |
| 5,270,537 | 12/1993 | Jacobs | 356/73.1 |
| 5,296,853 | 3/1994 | Federow et al. | 340/962 |
| 5,317,452 | 5/1994 | Prentiss et al. | 359/819 |
| 5,354,015 | 10/1994 | Meador | 340/580 |
| 5,394,340 | 2/1995 | Inkpen et al. | 340/962 |
| 5,396,079 | 3/1995 | Evers et al. | 250/577 |
| 5,475,370 | 12/1995 | Stern | 340/583 |
| 5,484,121 | 1/1996 | Padawer et al. | 244/134 F |
| 5,507,183 | 4/1996 | Larue et al. | 340/962 |
| 5,528,224 | 6/1996 | Wang | 340/583 |
| 5,596,320 | 1/1997 | Barnes | 340/962 |

*Primary Examiner*—Brent A. Swarthout
*Attorney, Agent, or Firm*—Steven G. Lisa

[57] ABSTRACT

A modulated light source (31) transmits light pulses via a prism (27) through a monofilament optical fiber light channel (20) to an optical sensor (10) remotely located and flush mounted to an aerodynamic surface (14) of the aircraft most likely to accrete ice. In the absence of ice little to no light is reflected inward via the light channel. When water, ice, or de-icing fluid covers the light sensor, an increased amount of light pulses are reflected inward through the single fiber optic light channel and prism assembly where they are detected by a light detector (34) which generates an electrical output signal indicative of the type, amount, and rate of ice accretion. The output signal is visually displayed (37) and the pilot may be audibly warned. In an alternate embodiment the remote light sensor (70) is fuselage mounted (72) with an airfoil shaped probe (71) having a clear lucite leading edge (73) to which is secured a pair of fiber optic light pipes (75,76), one for outbound (76) and the other for inbound (75) light pulses. This mode requires no prism assembly. All electronics are housed in the computerized control/display unit (30) other than the fiber optic cable and remote mounted light sensor.

32 Claims, 4 Drawing Sheets

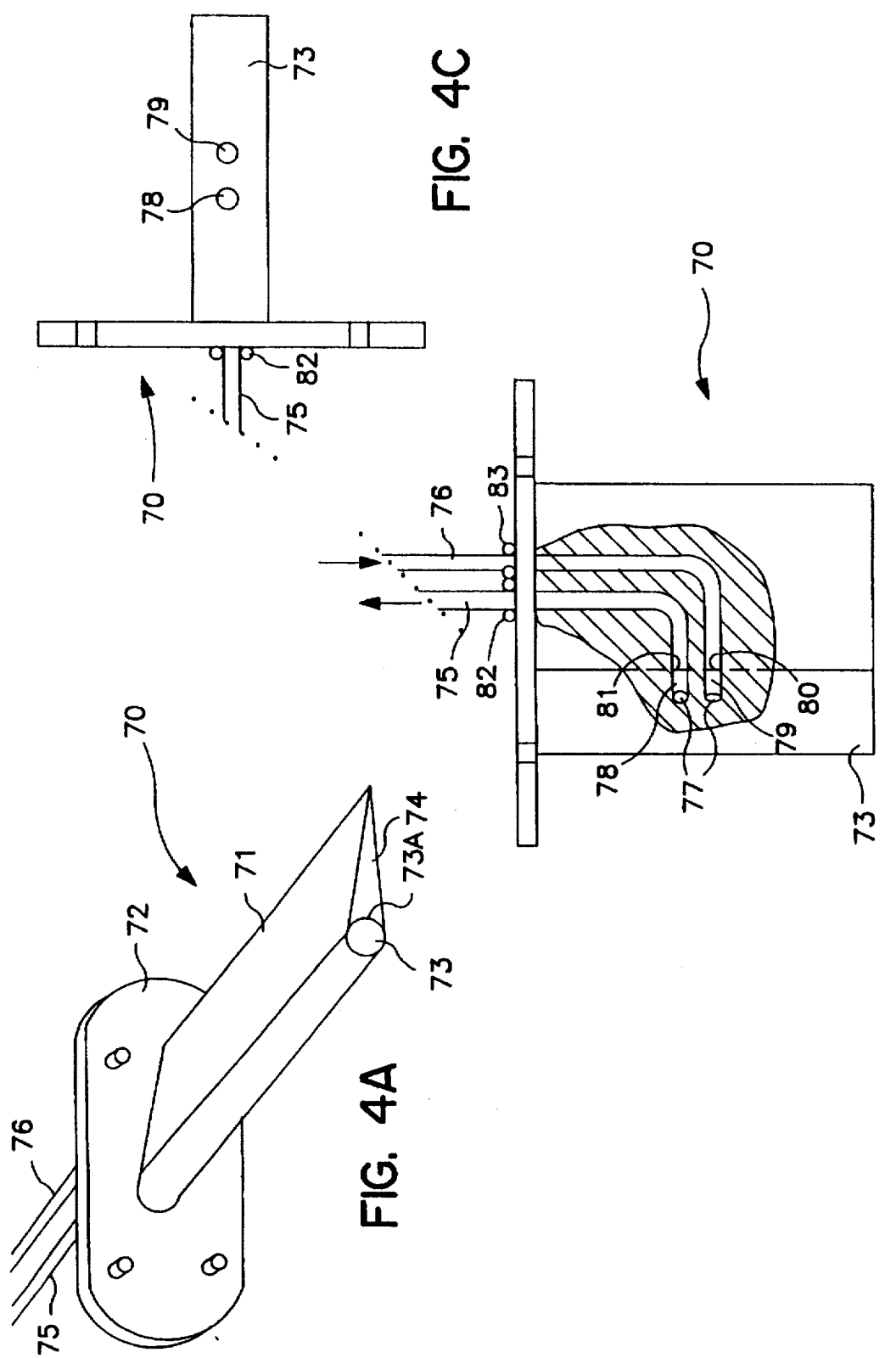

ICING DETECTION SYSTEM

BACKGROUND OF THE INVENTION

1. Fields of the Invention

The present invention relates generally to an apparatus and method of detecting aircraft wing and tail ice and ice accumulation, and, more particularly, to the use of a remote optical sensor located at or near the aerodynamic surface where icing most likely occurs connected by a light channel to a computerized cockpit ice indicator which can warn and differentiate type, rate, and thickness of ice accretion.

2. Discussion of the Prior Art

Aircraft technology has progressed by leaps and bounds over the past 60 years of powered flight. However, a nagging problem since the inception of IFR flight has been the unresolved safety concern surrounding in-flight icing. Thousands of deadly accidents have been attributed to airframe icing. This unfulfilled need has been most emphatically driven home by a recent commercial accident which has taken the lives of many passengers.

Modern aircraft are equipped with a wide variety of equipment which detect and warn pilots of hazardous weather conditions. Notwithstanding these advances, modern aircraft are still not adequately equipped to detect and warn pilots of ice adhering to critical parts of their airframe. Federal Regulations prohibit flight in icing conditions that exceed those defined in F.A.R. Part 25, Appendix C. Nonetheless, flight in freezing drizzle or freezing rain, where the size of supercooled water droplets suspended in air and ready to freeze on the first solid object they touch exist in the atmosphere and pose the greatest icing hazard, are regularly made by commercial aircraft on authorized flights. Freezing drizzle, in particular, is a silent invisible killer which is only made worse by darkness and its accumulation on aircraft parts not visible to the pilot under any circumstances, such as, tail surfaces where ice build-up is especially lethal.

A fundamental problem according to the Airline Pilots' Association, is that there exists a serious disharmony between the criteria used for certification of an aircraft and the criteria used for dispatch and operation of that aircraft. Thus, there is a long felt need for a reliable method of detecting critical icing conditions from the cockpit so that once icing conditions are encountered, they may be detected and the pilot may either remove the ice with anti-ice systems or alter course and get out of the hazardous condition.

Over the years a wide variety of aircraft ice detection systems have been invented employing virtually every known physics principle, without success. Just to name a few, such systems have included, for example, a pneumatic system of Blaha in U.S. Pat. No. 5,301,905; the temperature systems of Kleven in U.S. Pat. No. 4,980,673 and Hansman in U.S. Pat. No. 5,313,202; the vibrational systems of Marxer in U.S. Pat. No. 4,553,137 and Koosmann in U.S. Pat. No. 4,611,492 (Assignee Rosemount); the force system of Daniels in U.S. Pat. No. 4,775,118 (Assignee Boeing); the ultrasonic system of Watkins in U.S. Pat. No. 4,604,612; and the flush mounted electrical/temperature hybrid system of Weinstein (Assignee NASA) in U.S. Pat. No. 4,766,369. None of these systems has achieved any widespread commercial success.

It is known to use aircraft ice detection systems having optical components. For example, in a system to Mischoud in U.S. Pat. No. 5,014,042 there is disclosed a system which employs an optical channel employing a prism sensor at one end of an optical channel comprising a fiber optic bundle which reflects light in a no ice condition, but refracts the light externally of the system in the presence of water or ice thereby reducing or eliminating reflected light. In that system, rain produces a low frequency modulation of the quantity of reflected light which is demodulated to differentiate rain from ice. Mischoud does not disclose or suggest the use of an optical sensor which increasingly reflects light pulses as a function of the nature and amount of substance which accretes on its outer surface and cannot differentiate between types of ice and de-icing fluid. Accordingly, it is an object of the present invention to employ an optical light sensor which reflects increased light in the presence of ice and is capable of differentiating between types of ice, water, and de-icing fluid and identifying the amount and rate of ice accretion on the optical sensor.

It is also been known to use an infrared laser light source in a remote location in the wing leading edge for deriving signals representative of icing used to provide a cockpit alarm as in the system to Federow U.S. Pat. No. 5,296,853. However, such system does not suggest the use of a laser as a light source remote from the optical sensor in the wing and coupled thereto by a light channel. Accordingly, it is an object of the present invention to house the light source in the cockpit indicator and couple the light source to the optical sensor via an optical fiber light channel.

There are several ice detection systems in very limited use on present large aircraft. One such system uses a fuselage mounted 1" diameter gear that continually rotates when the aircraft is in flight. If any ice builds up on the gear, the ice will brush up against a microswitch as the gear rotates and will trigger a caution light to the flight crew. The system works so poorly that flight crews generally ignore the warnings, deferring to an also ineffective visual inspection. The main drawbacks of the system are the moving parts, the microswitch itself freezing up, and the fact that the system is not mounted on the wings or tail—the location where ice build-up is critical.

Another such known system is an ultrasonic ice detector currently being tested on small passenger jets—aircraft particularly susceptible to ice. The sensor uses about 4" of wing space and consists of a disk that vibrates continuously. Any ice build-up changes the frequency of the vibration and thus alerts the pilots. There are also several drawbacks with this unit, too. First, it is also a non-solid state product. The cold high altitude temperatures and temperature changes make frequency calibration unreliable. Secondly, due to the size of the unit and the flat wing space required it cannot be mounted on the curved leading edge of the wing—the very first area to be affected by ice build-up. By the time any ice would cover this unit, the accumulation could be severe. The other drawbacks of this system are high cost, environmentally exposed wing-mounted electronics, and a lack of redundancy—only one sensor per aircraft.

See also U.S. Pat. Nos. 4,803,470; 5,270,537; 5,484,121; 5,528,224 and 5,596,320 for additional ice detection systems and methods.

At the present time there are no known electronic ice detection systems for small or midsize aircraft.

Accordingly, as indicated above, there is still a long felt need for an effective ice detection system for all aircraft, large or small, and it is the primary object of this invention to fill this need with a small, non-intrusive, solid state, low cost, remote ice detection system, which can be redundantly located at the critical surfaces most likely to be affected by ice build-up.

3

SUMMARY OF THE INVENTION

Set forth below is a brief summary of the invention in order to achieve the forgoing and other benefits and advantages in accordance with the purposes of the present invention as embodied and broadly described herein.

One aspect of the invention is a substance detection system including an optical sensor adapted to be mounted to an external surface directly exposed to outside weather conditions and which increasingly reflects light as a function of the nature and amount of a substance which accretes on its outer surface, an optical channel coupled at an outboard end of the optical sensor, and a logic unit coupled to an inboard end of the optical channel and housing therein a modulated light source for transmitting light pulses through the optical channel to the optical sensor which reflects an amount of the light pulses indicative of the presence of a substance on the optical sensor, and a light detector for receiving the reflected light pulses from the optical sensor through the optical channel and for generating an electrical output signal indicative of the reflected light pulses.

A further feature of this aspect of the invention is the external surface is an aerodynamic surface of an airframe, the logic unit includes a digital computer and visual display adapted to be mounted in an aircraft instrument panel, and the substance is ice, water, or de-icing fluid.

Further features of this aspect of the invention are the optical sensor having a flush mounting to the external surface including a base having a bevelled peripheral portion, adapted to seat in a bevelled recess in the external surface, and a central bore, a single sided convex lens having its flat side outboard and its convex side inboard secured to the outboard end of the central bore, an optical fiber secured to the inboard end of the central bore and operatively coupled to the lens, a zero refractivity indexing gel filling the air gap between the lens and the optical fiber, and an o-ring compressed against the outside wall of the optical fiber to secure the fiber in the bore.

A further feature of this aspect of the invention is that the base of the optical sensor has a peripheral portion the size and shape of a standard aircraft rivet adapted to mount into an aircraft rivet hole, or, for new installations, has a threaded peripheral portion adapted to directly mount into an aircraft airframe structure.

A further feature of this aspect of the invention is the optical channel is a monofilament multi-mode optical fiber light guide and the coupling between the logic unit and the optical channel is a prism assembly for transmitting the emitted light pulses from the light source to the optical sensor and the reflected light pulses from the optical sensor to the light detector.

A further feature of this aspect of the invention is the light source may be an infrared light emitting diode and a modulator for emitting light pulses having a predetermined frequency of 1000 Hz or a solid state laser source, and the light detector is a photodetector, such as, an infrared detector.

A further feature of this aspect of the invention includes a logic unit which further includes a computer/display unit having a digital computer for providing a display signal indicative of the output signal from the light detector, and a display for visually presenting the display signal. The display may include any one or all of the following: an indication of the presence of water, de-icing fluid, clear ice, or rime ice on the optical sensor; an indication of the amount or rate of ice accretion; a warning signal indicative of the output signal from the light detector; an audio circuit for aurally presenting the warning signal as a tone or digitized voice warning; an indicator for warning a human operator of the proper or improper operation of the system.

4

In summary, the system of the present invention serves as an ideal safety device to supplement and automatically detect in-flight icing conditions encountered by aircraft. With its small size and non-obtrusive installation of the optical sensor portion in the leading edge and other areas of critical aerodynamic surfaces in current aircraft, this system is able to fill the long felt need for a low cost ice detection system for all size aircraft.

BRIEF DESCRIPTION OF THE DRAWINGS

FIG. 4A is a perspective view of a second embodiment of the optical sensor of the present invention.

FIG. 4B is a plan view in partial section of the optical sensor of FIG. 4A.

FIG. 4C is a front elevation of the optical sensor of FIG. 4C.

DETAILED DESCRIPTION OF THE PREFERRED EMBODIMENT

1. Overview

Prior to the present invention, from the smallest two seat trainer to the largest commercial jet, ice detection is usually visual. Typically, the flight crew notices an ice accumulation on some obstruction in front of the window—such as the windshield wiper blade. The ability to observe the actual wing ice build-up is very, if not completely, limited. At night, crew members use a flashlight to inspect surfaces.

Figure 1:
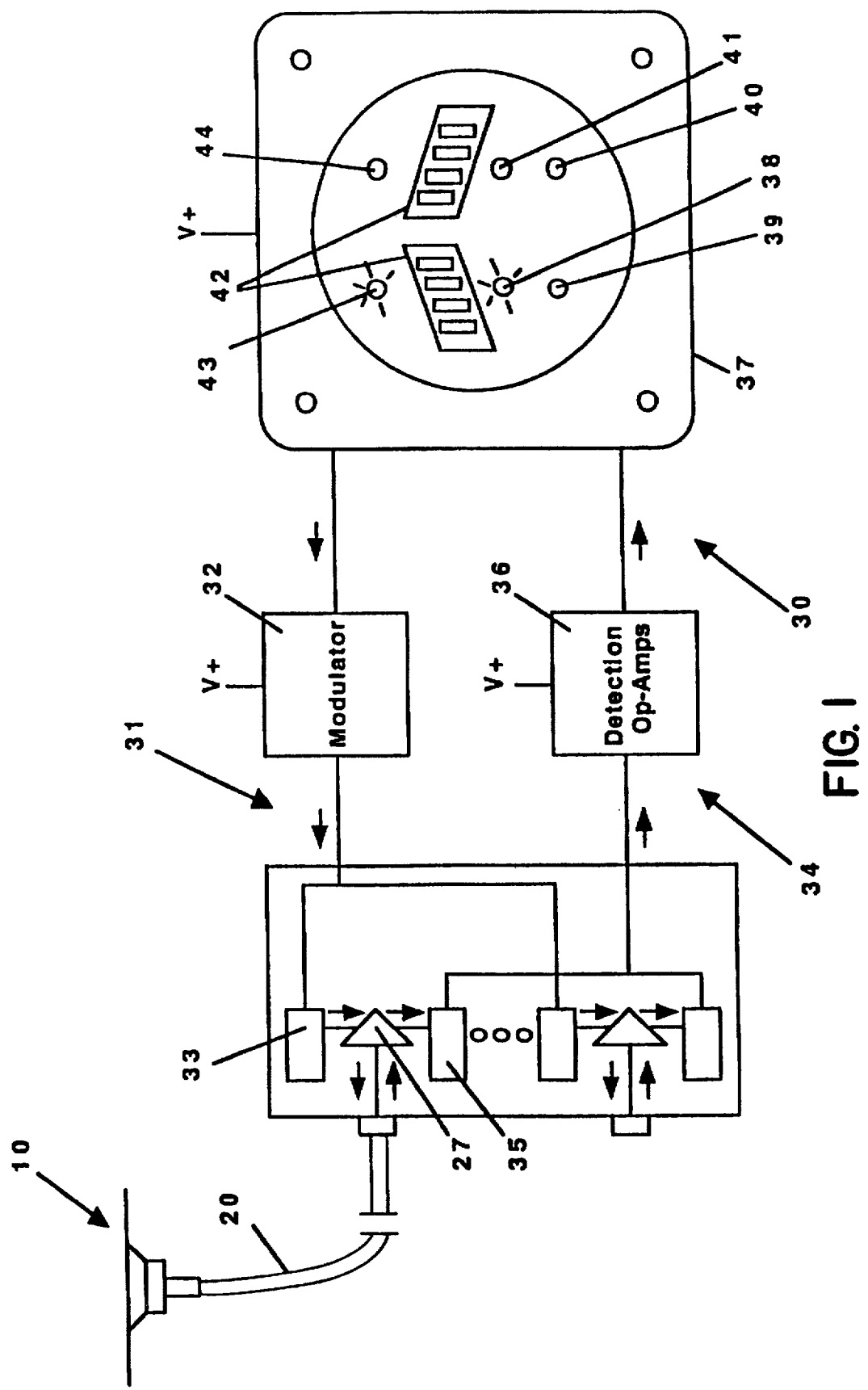
FIG. 1 is an overall schematic diagram of a first embodiment of the present invention.

As seen in FIG. 1, the ice detection system of the present invention includes three main components, the optical ice sensors 10, the fiber-optic sensor cables 20, and the computer/display unit 30. The present invention eliminates the prior practice described above by actually looking up with the optical sensors 10 from several points on the wing itself and automatically determining if ice accumulation on that critical surface is taking place. The signals from the wing probes are then routed via optical fibers 20 to the cockpit mounted display/control computer 30 that would aurally and visually warn the flight crew that icing conditions were being encountered. The warnings and indicators in turn give the crew an early, immediate cue to do something about that accumulation.

2. The Optical Sensor

The optical sensor 10 is adapted to be mounted to an external surface 14 directly exposed to outside weather conditions and which increasingly or descreasingly reflects light as a function of the nature and amount of a substance which coats or accretes on its outer surface, as more fully described below.

Figure 2:
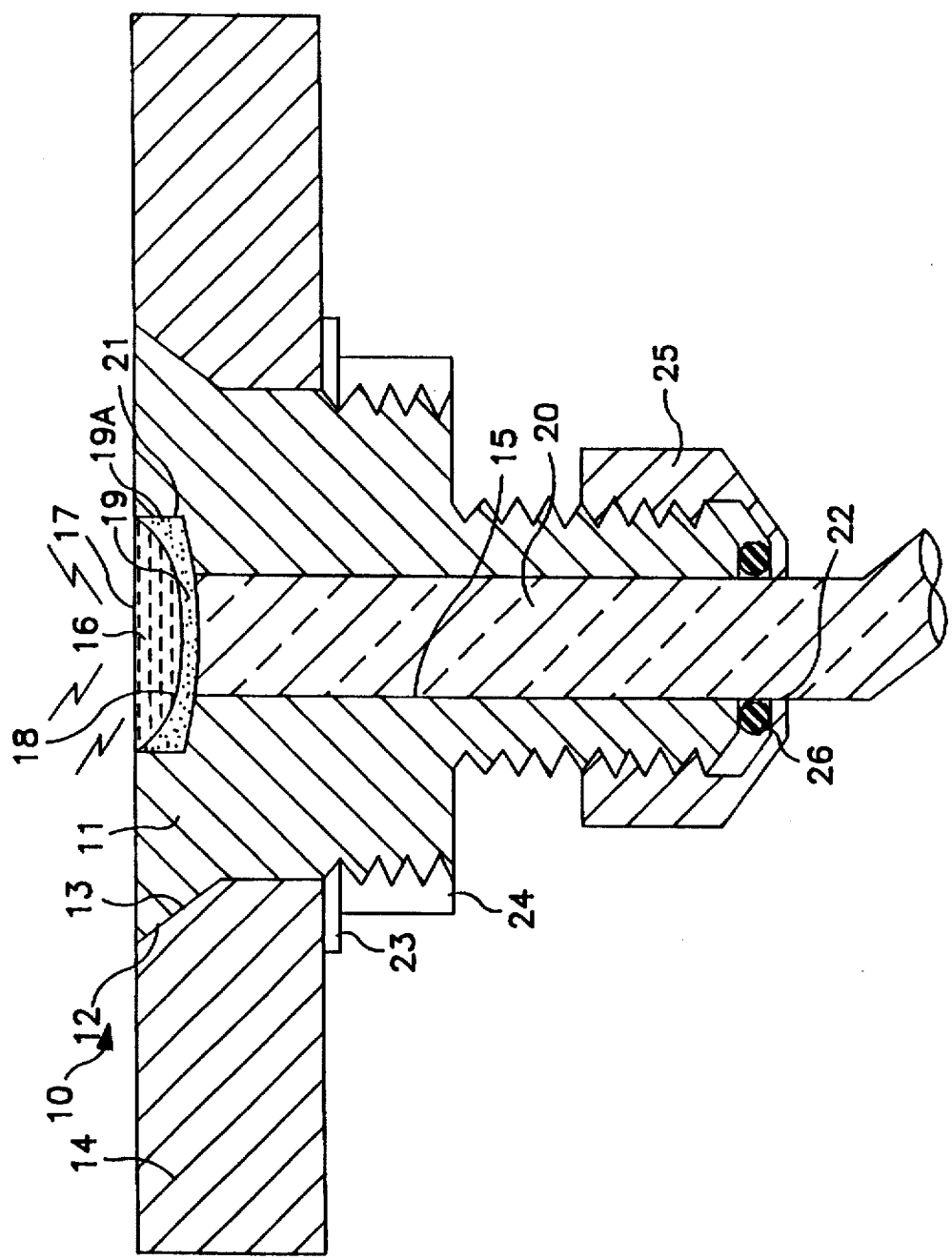
FIG. 2 is a sectional view of the optical sensor of the first embodiment of the present invention flush mounted to an aerodynamic surface of an aircraft airframe.

As seen in FIG. 2, the optical sensor 10 has a base portion 11 which has a beveled periphery portion 12 adapted to seat in a beveled recess 13 in the external flush mounted surface 14, such as, the wing skin of the aircraft or a portion of the aircraft fuselage or airframe. The base 11 has a central bore 15 to which is secured at the outer end 21 a single sided convex lens 16 having its flat side 17 pointing outward and its convex side 18 pointing inward. Optical fiber 20 is secured to the inboard end 22 of the central bore 15 and is operatively coupled to lens 16, such as, with a zero refractivity indexing gel 19 which fills the air gap between the lens 16 and the optical fiber 20 thereby effectively fusing the coupling between the fiber and lens. Indexing gel. 19 is a clear grease well known in the industry. Base 11 is secured to wing skin 14 by lock washer 23 and lock nut 24.

Lens 16 is a polished lens system.

The optical sensor 10 has, preferably, an outside diameter of less than 6.35 mm and can be designed to mount in an existing aircraft rivet hole. For new aircraft installations, a flush mounted threaded detector (not shown) would be available. It is envisioned that 4–5 of these detectors 10 would be mounted on each wing in ice-critical areas for the maximum ice detection capability. Each sensor 10 would require only one cable 20. This cable would typically be a 1 mm commercial grade poly-optic, precalibrated and terminated for lengths of up to 100'.

The optical fiber 20 is a conventional 1 mm poly-optic, multi-mode monofilament, optical fiber lightguide preferably made of PVC and having a Kevlar™ jacket. The fibers are precalibrated and terminated for lengths of up to 100 feet. In the embodiment of FIGS. 1,2 a single optical fiber is used for two-way transmission of emitted and reflected light pulses as more fully described below. Optical fiber 20 is secured within central bore 15 by threaded compression fitting 25 which compresses O-ring 26 against the outer wall of optical fiber 20.

The optical sensor shown in FIG. 2 is assembled as follows:

First, optical fiber 20 is laid in the aircraft between the wing skin recess 13 and the control display unit 30. Locknut 24 and washer 23 are inserted over fiber 20. Then, lens 16 is glued 19A into the outboard end 21 of the central bore 15 of base 11. Next, the end of the fiber optic is cleaved, indexing gel 19 is squirted into the gap between the lens and the optical fiber and the optical fiber is then inserted into central bore 15 until it is compressed all the way in and then the compression fitting 25 is tightened to compress the O-ring 26 against the outside wall of the optical fiber and hold it securely in place. Base 11 is secured to surface 14 by tightening locknut 24 and washer 23.

2. Computer/Display Unit

The final component of the system is the Computer/Display Unit ("CDU") 30 shown schematically in FIG. 1. This unit would fit in a standard instrument panel 3.5" cutout and would contain all of the electronics for the system. This unit runs on either 12 or 28 volt DC system power.

The CDU 30 is a logic unit which is coupled to the inboard end of the optical channel 20 and houses therein a modulated light source 31 for transmitting light pulses through the optical channel 20 to the optical sensor 10 which reflects an amount of the light pulses indicative of the presence of a substance on the outside surface of the optical sensor 10. The light source 31 may include an infrared light emitting diode 33 and a modulator circuit 32 for emitting light pulses having a predetermined frequency of 1000 Hz. Preferably, however, the light source is a solid state 830 nm laser source. The CDU 30 further includes a light detector 34 which may be an infrared light emitting diode 35 and operational amplifier 36 or, preferably, is a photodetector, such as, a phototransister. Light detector 34 receives the reflected light pulses from the optical sensor 10 through the optical channel 20 and generates an electrical output signal of proportional amplitude to indicate the reflected light pulses. Op amp 36 amplifies the output signal so that it may be utilized in the control/display unit 37.

The CDU 30 also includes prism assembly 27 for transmitting the emitted light pulses from the light source 31 to the optical sensor 10 and the reflected light pulses from the optical sensor 10 to the light detector 34.

Finally, the CDU 30 includes a digital computer (not shown) for providing a display signal indicative of the output signal from the light detector 34, and a display for visually presenting the display signal. The control/display unit 37, as seen in FIG. 1, has LEDs to indicate a warning for clear ice 38, rime ice 39, rain 40, and a de-icing fluid 41. The computer 30 may also calculate and display as by LEDs 42 an indication of the amount or rate of ice accretion. Additionally, there are LED displays 43 to indicate the system is on and operating properly and a LED 44 to warn the pilot of system failure.

Finally, the computer 30 may also issue an audible warning, such as, a tone or digitized voice warning that ice is forming.

3. Operation of the System

Figure 3:
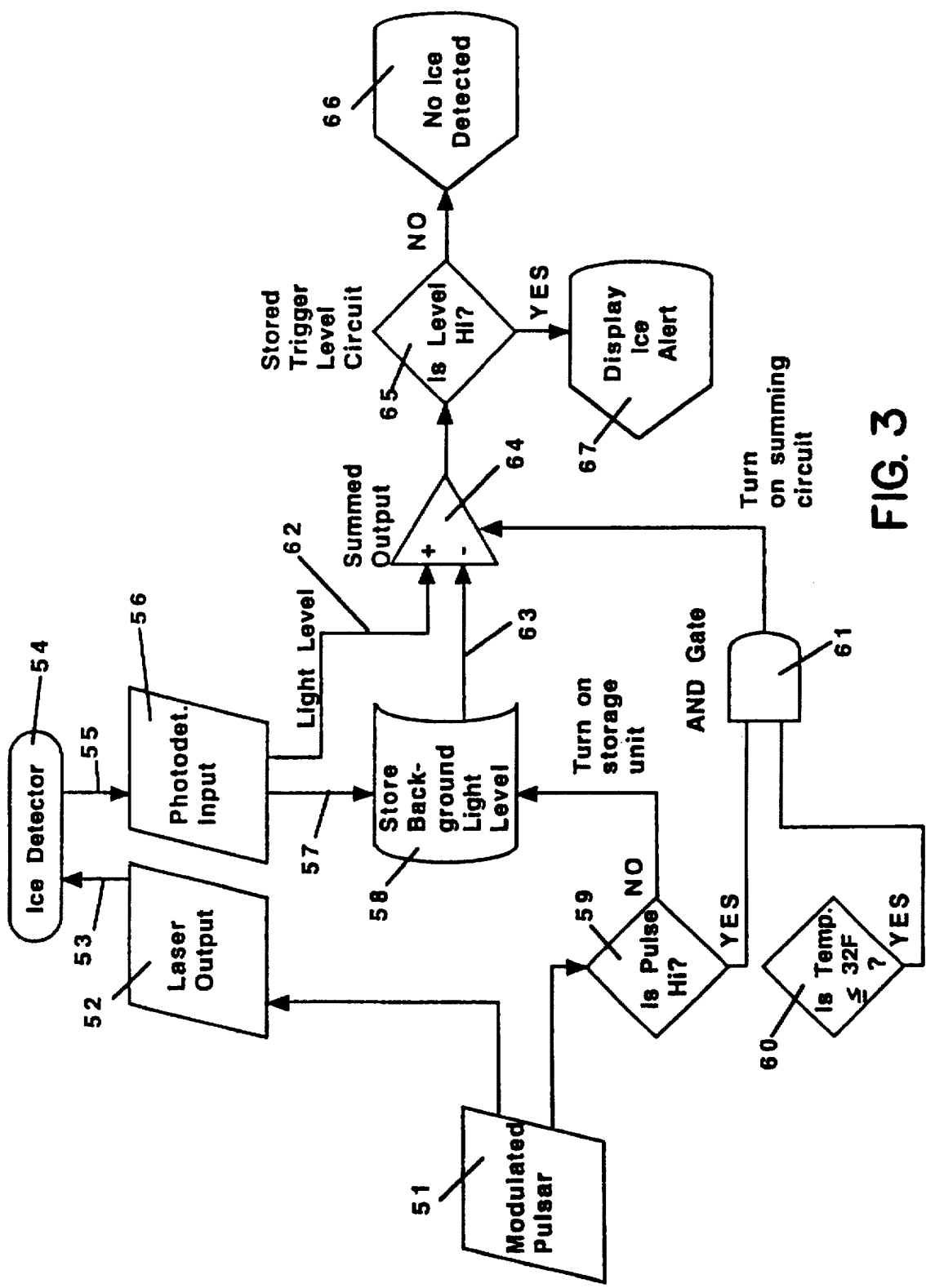
FIG. 3 is a flow chart of the process programmed into the digital computer of the present invention.

The operation of the system is best understood by reference to FIG. 3 which is a flow chart of the computer program in the microprocessor contained in the computer control/display unit 30. Modulated pulser 51 may be simply an integrated circuit flasher which triggers laser output 52 to emit light pulses through the outbound light channel 53 to the ice detector 54. A certain amount of the pulsed light is reflected back into the ice detector 54 due to the presence of water, de-icing fluids, clear ice, or rime ice on the exterior surface of ice detector 54. The amount of reflected light is predetermined and precalibrated to detect and identify the type and amount of substance covering light sensor 10. A no-ice condition would result in a preset biasing level—basically, very little reflected light. The reflected light travels inbound via light channel 55 where it is received by the photo detector input 56 which generates a voltage proportional to the returned light level. This voltage level is sent via line 57 to be stored as background light level 58 during the low period of the pulse 59 during which time the background storage is enabled. The voltage level is also sent via line 62 to the positive terminal of summation circuit 64. The background light level from storage 58 is provided via line 63 to the negative terminal of summation circuit 64 which is enabled only when the pulse output is high on one terminal of AND gate 61 and the temperature is equal to or less than 32 degrees which enables the other terminal of AND gate 61 thereby turning on summation circuit 64. Optionally, the temperature probe 60 may be eliminated to provide a less expensive, but also, less accurate alternative. In that case, AND gate 61 may be eliminated and summation circuit 64 enabled directly by HI pulse 59.

Storage of the reflected light pulses as background light level in storage 58 during the low period of the output pulses effectively records ambient light. Storage 58 is accumulative storage. If there is no coverage on the light sensor 10, no light will be reflected back. Accumulated fluid or ice causes increased reflection and a higher reflected signal output on line 57 which is cumulatively stored in storage 58 and then compared via line 63 to the still further increased light levels appearing on line 62 of the summation circuit. Thus, the quantum of the output signal of the summation circuit 64 is indicative of the type and amount of covering on the ice detector 54. The microprocessor controlling the summed output can also detect the rate of accretion reflected in the output signal of the summation circuit 64. Finally, if the output level of summation circuit is not high 65 then no ice has been detected 66. If the output level of summation circuit is high, then the ice alert 67 is displayed schematically (such as in a bar graph LEDs) and via the audio driver circuit (not shown) which provides a warning tone or digitized voice warning.

All of the electronics circuitry may be contained behind the panel mounted display in, for example, a 3.5"×6.0" deep "can" or similar small self contained display. The total

4. Fuselage Surface Mounted Light Sensor

As best seen in FIGS. 4A, 4B, and 4C a fuselage surface mounted light sensor 70 is shown having an airfoil shaped probe 71 fixedly mounted to a flange type base 72. Surface mount 70 is mounted like a pitot tube or antennae mounted to a fuselage surface such that the probe projects into the air stream and the base is screwed to the fuselage by screws in the holes shown in FIG. 4A. The cord line of the airfoil shape 71 should be parallel to the longitudinal axis of the aircraft so that it makes a zero angle of attack and provides minimum drag in the air stream. The airfoil shaped portion 71 has a transparent leading edge 73 being the forward portion of a lucite rod, the trailing portion 73A of which is contiguous with the fiberglass fairing 74.

Probe 70 is preferably made of an injection molded ultraviolet resistant poly-carbonate material and is chrome plated. It may also be colored if desired.

Disposed within probe 70 is a pair of monofilament multi-mode 1 mm plastic communications jacketed fibers for transmitting inbound light pulses 76 and for outbound light pulses 75. Alternatively, as seen in FIG. 1, a single 1 mm polyoptic, multi-mode monofilament, optical fiber light guide made of PVT with a kavlar™ jacket may be used. The outboard ends of optical fibers 78,79 are secured in drilled holes 80,81 in the rearward wall of lucite rod 73 and with indexing gel 77. The gel 77 optically fuses the light pipes 78-79 to the lucite rod 73. As a light sensor, probe 70 functions in the same manner as light sensor 10 previously described. In the absence of a covering substance, little to no light is reflected in inbound pipe 75. However, as a a solid covering of ice accretes on the leading edge of lucite rod 73, an increasing amount of reflected light is directed into inbound pipe 75,78 causing an icing signal to be generated and displayed as previously described. The inbound ends of optical fibers 78,79 extend through the base 72 of probe 70 and are coupled to the cockpit control/display unit 30 and grommeted to base 72 of probe 70 for securement thereto.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A substance detection system comprising:
   (a) an optical sensor configured and constructed to be mounted to a surface exposed to atmospheric conditions and which variably returns light as a function of the nature of a substance which covers the sensor,
   (b) an optical channel coupled to the optical sensor, and
   (c) a logic unit remote from the surface and coupled to the optical channel, and including:
      (i) a modulated light source coupled to and transmitting light pulses through the optical channel to the optical sensors, which sensor returns an amount of the light pulses in relation to the nature and presence of a substance on the optical sensor, and
      (ii) a light detector structured to receive the returned light pulses from the optical sensor through the optical channel and generate an electrical output signal indicative of the returned light pulses; and
      (iii) an indicator configured to signal the identity of the substance and the amount and rate of substance accumulation on the sensor.

2. The substance detection system of claim 1 wherein the indicator includes a visual display that receives the output signal generated by the light detector.

3. The substance detection system of claim 1 wherein:
   (a) the surface is an external aerodynamic surface of an airframe,
   (b) the indicator includes a visual display configured and constructed to be mounted in an aircraft instrument panel, and
   (c) the substances detected on the aerodynamic surface are ice, water, and de-icing fluid.

4. The substance detection system of claim 1 further comprising the optical sensor having a mounting that is flush to an external portion of the surface.

5. The substance detection system of claim 4 wherein the flush mounting further comprises:
   (a) a base having a beveled peripheral portion, configured and constructed to seat in a beveled recess in the external surface, and a central bore,
   (b) a lens secured to an outboard end of the central bore, and
   (c) an optical fiber secured to an inboard end of the central bore and operatively coupled to the lens.

6. The substance detection system of claim 5 wherein the operative coupling further comprises:
   (a) a zero refractivity indexing gel filling an air gap between the lens and the optical fiber, and
   (b) an O-ring compressed against the outside wall of the optical fiber to secure the fiber in the bore.

7. The substance detection system of claim 5 wherein the lens is a single sided convex lens having its flat side outboard and its convex side inboard.

8. The substance detection system of claim 4 wherein the external surface is an aerodynamic surface of an airframe and the flush mounting further comprises a base having a peripheral portion the size and shape of a standard aircraft rivet configured and constructed to mount into an aircraft rivet hole.

9. The substance detection system of claim 4 wherein the external surface is a non-openable aerodynamic surface of an airframe and the flush mounting further comprises a base having a threaded peripheral portion configured and constructed to mount into an aircraft airframe structure.

10. The substance detection system of claim 1 wherein the optical channel is a monofilament multi-mode optical fiber light guide, and the coupling between the logic unit and the optical channel further comprises a prism assembly for transmitting the emitted light pulses from the light source to the optical sensor and the returned light pulses from the optical sensor to the light detector.

11. The substance detection system of claim 1 wherein the light source further comprises a light emitting diode and a modulator that emits light pulses, wherein the light detector is a photodetector, and wherein the returned light pulses are reflected by the optical sensor.

12. The substance detection system of claim 11 wherein the light pulses have a predetermined frequency.

13. The substance detection system of claim 1 wherein the logic unit includes a circuit structured to provide a display signal corresponding to the output signal from the light detector, and the indicator includes a visual display that presents a visual indication corresponding to the display signal.

14. The substance detection system of claim 13 wherein the display signal further includes an indication of the presence of one of water, de-icing fluid, clear ice, and rime ice on the optical sensor.

15. The substance detection system of claim 13 wherein the display signal further includes an indication of the identity of type and rate of ice accretion.

16. The substance detection system of claim 1 wherein the indicator includes:
   (a) a warning circuit structured to provide a warning signal indicative of the output signal from the light detector, and
   (b) an audio circuit that aurally presents the warning signal.

17. The substance detection system of claim 1 wherein the indicator outputs a warning signal to a human operator indicative of the operating condition of the system.

18. The substance detection system of claim 1 wherein the light source is a solid state laser source.

19. The substance detection system of claim 1 wherein the light detector is a photodetector.

20. The substance detection system of claim 1 wherein the variably reflected light increases under certain conditions.

21. The substance detection system of claim 20 wherein the reflected light increases when the detected substance is a solid.

22. The substance detector of claim 1 wherein the optical channel is a pair of multi-mode monofilament optical fibers.

23. The substance detector of claim 1 wherein the surface is an external aerodynamic surface of a craft and the output signals are displayed to an operator of the craft while the craft is airborne.

24. The substance detection system of claim 4 wherein the flush mounting further comprises:
   (a) a base having a beveled peripheral portion, constructed and configured to seat in a beveled recess in the external surface, and a central bore,
   (b) a lens secured to the outboard end of the central bore, and
   (c) an optical fiber operatively coupled to the lens.

25. The substance detection system of claim 24 wherein the operative coupling further comprises a zero refractivity indexing gel filling an air gap between the lens and the optical fiber.

26. The substance detection system of claim 1 wherein the optical channel is a monofilament multi-mode optical fiber light guide.

27. An airframe ice detection system comprising:
   (a) an ice detector adapted to be mounted proximate an external surface of an airframe structure, and structured to return light as a function of the nature of a substance which covers the detector,
   (b) a single optical fiber coupled at one end to the ice detector, and
   (c) a logic display unit including,
      (i) an optical system coupled to the other end of the optical fiber,
      (ii) a modulated light source configured to transmit pulsed light to the prism and through the optical fiber to the ice detector which returns an amount of the light pulses from the light source indicative of the presence of ice which forms over the ice detector,
      (iii) a light detector that receives the reflected light pulses from the ice detector through the optical fiber and prism and for generating an output signal proportional to the reflected light pulses, and
      (iv) a display device adapted to be mounted in an aircraft instrument panel and configured to indicate the identity of the substance and the amount and rate of substance accumulation on the surface.

28. A substance detection system comprising:
   (a) an optical sensor adapted to be mounted to a surface exposed to atmospheric conditions and which variably returns light as a function of the nature of a substance which covers the sensor,
   (b) an optical channel coupled to the optical sensor,
   (c) a logic unit coupled to the optical channel and including:
      (i) a modulated light source that transmits light pulses through the optical channel to the optical sensor which returns an amount of the light pulses indicative of the presence of a substance on the optical sensor, and
      (ii) a light detector configured to receive the returned amount of the light pulses from the optical sensor through the optical channel and to generate an electrical output signal indicative of the returned amount of the light pulses, and
      (iii) a display configured to receive the output signal and indicate the identity of the substance and the amount and rate of substance accumulation on the surface.

29. The substance detection system of claim 28 wherein the returned light pulses are reflected by the optical sensor.

30. A substance detection system comprising:
   (a) an optical sensor adapted to be mounted to an external surface directly exposed to outside weather conditions and which variably reflects light as a function of the nature of a substance which covers the sensor,
   (b) a multi-mode, monofilament optical fiber coupled at an outboard end to the optical sensor, and
   (c) a logic unit coupled to an inboard end of the optical fiber and housing therein,
      (i) a modulated light source that transmits light pulses through the optical fiber to the optical sensor which reflects an amount of the light pulses indicative of the presence of a substance on the optical sensor,
      (ii) a light detector that receives the reflected light pulses from the optical sensor through the optical fiber and generates an electrical output signal indicative of the reflected light pulses, and
      (iii) a display device that receives the output signal and indicates the identity of the substance and the amount and rate of substance accumulation on the sensor.

31. The substance detector of claim 30 wherein the optical fiber has a longitudinal axis which is normal to the external surface.

32. The substance detector of claim 30 wherein the modulation is pulse modulation, and the light pulses are discrete light pulses.

* * * * *

UNITED STATES PATENT AND TRADEMARK OFFICE
CERTIFICATE OF CORRECTION

PATENT NO. : 5,760,711
DATED : June 2, 1998
INVENTOR(S) : Joseph D. Burns

It is certified that error appears in the above-identified patent and that said Letters Patent is hereby corrected as shown below:

On the title page: Item [56] Reference Cited:

The following references were omitted from the References Cited section of the patent:

| | | | |
|---|---|---|---|
| 3,976,270 | 8/1976 | Catchpole | 244/134F |
| 4,054,255 | 10/1977 | Magenheim | 244/134F |
| 4,210,021 | 7/1980 | Vykhodtsev | 340/580 |
| 4,274,091 | 6/1981 | Decker | 340/583 |
| 4,379,227 | 4/1983 | Kovacs | 340/583 |
| 4,461,178 | 7/1984 | Chamuel | 340/582 |
| 4,553,137 | 11/1985 | Marxer | 340/582 |
| 4,570,881 | 2/1986 | Lustenberger | 340/582 |
| 4,604,612 | 8/1986 | Watkins | 340/582 |
| 4,611,492 | 9/1986 | Koosmann | 340/582 |
| 4,628,736 | 12/1986 | Kirby | 340/582 |
| 4,745,804 | 05/1988 | Goldberg | 340/580 |
| 4,766,369 | 8/1988 | Weinstein | 340/580 |
| 4,775,118 | 10/1988 | Daniels | 340/580 |
| 4,797,660 | 1/1989 | Rein | 340/583 |
| 4,808,824 | 2/1989 | Sinnar | 250/339 |
| 4,819,480 | 4/1989 | Sabin | 340/581 |
| 4,882,574 | 11/1989 | Khurgin | 340/581 |
| 4,913,519 | 4/1990 | Klainer | 340/601 |
| 4,980,673 | 12/1990 | Kleven | 340/581 |

UNITED STATES PATENT AND TRADEMARK OFFICE
CERTIFICATE OF CORRECTION

PATENT NO. : 5,760,711          Page 2 of 2
DATED      : June 2, 1998
INVENTOR(S): Joseph D. Burns It is certified that error appears in the above-identified patent and that said Letters Patent is hereby corrected as shown below:

| | | | |
|---|---|---|---|
| 5,003,295 | 3/1991 | Kleven | 340/581 |
| 5,005,015 | 4/1991 | Dehn | 340/962 |
| 5,095,754 | 3/1992 | Hsu | 340/962 |
| 5,140,135 | 8/1992 | Freeman | 340/581 |
| 5,180,122 | 1/1993 | Christian | 340/583 |
| 5,206,806 | 4/1993 | Gerardi | 340/582 |
| 5,243,185 | 9/1993 | Blackwood | 340/583 |
| 5,301,905 | 4/1994 | Blaha | 244/134F |
| 5,313,202 | 5/1994 | Hansman | 340/962 |
| 5,467,944 | 11/1995 | Luukkala | 340/582 |
| 5,474,261 | 12/1995 | Stolarczyk | 340/582 |

Signed and Sealed this

Eighth Day of December, 1998

Attest:

BRUCE LEHMAN

*Attesting Officer*          *Commissioner of Patents and Trademarks*